US012569773B2

(12) United States Patent
Charron et al.

(10) Patent No.: US 12,569,773 B2
(45) Date of Patent: Mar. 10, 2026

(54) AUTOMATED VIDEO GAME TEST BED AND METHODS

(71) Applicant: Activision Publishing, Inc., Santa Monica, CA (US)

(72) Inventors: Maxime Charron, Quebec (CA); Philippe Troie, Quebec (CA)

(73) Assignee: Activision Publishing, Inc., Santa Monica, CA (US)

( * ) Notice: Subject to any disclaimer, the term of this patent is extended or adjusted under 35 U.S.C. 154(b) by 431 days.

(21) Appl. No.: 18/221,858

(22) Filed: Jul. 13, 2023

(65) Prior Publication Data

US 2024/0017182 A1     Jan. 18, 2024

Related U.S. Application Data

(60) Provisional application No. 63/368,614, filed on Jul. 15, 2022.

(51) Int. Cl.
*A63F 13/90*          (2014.01)
(52) U.S. Cl.
CPC ................................... *A63F 13/90* (2014.09)

(58) Field of Classification Search
CPC ...................................................... A63F 13/90
See application file for complete search history.

(56) References Cited

U.S. PATENT DOCUMENTS

| | | | | |
|---|---|---|---|---|
| 10,926,184 B2 * | 2/2021 | Lucas | .................... | A63F 13/77 |
| 10,949,325 B1 * | 3/2021 | Culibrk | ............... | G06F 11/3612 |
| 11,090,569 B1 * | 8/2021 | Wu | ......................... | A63F 13/67 |
| 11,126,539 B2 * | 9/2021 | Cappello | ............. | G06F 11/3684 |
| 11,179,644 B2 * | 11/2021 | Yen | ......................... | A63F 13/86 |
| 11,216,358 B2 * | 1/2022 | Mayhew | ................ | A63F 13/63 |
| 11,235,241 B2 * | 2/2022 | Scheurwater | ........... | A63F 13/30 |
| 11,446,570 B2 * | 9/2022 | Borovikov | ............. | G06N 20/00 |
| 12,066,883 B2 * | 8/2024 | Gisslén | ................ | G06T 15/506 |

* cited by examiner

*Primary Examiner* — Reginald A Renwick

(74) *Attorney, Agent, or Firm* — Ray Quinney & Nebeker P.C.; John O. Carpenter

(57) ABSTRACT

Testing of a video game may include a test farm of game machines having different configurations. Different builds of a video game may be provided to the game machines, and the game machines may execute the video game. While executing the video game, the game machines may have an avatar travel along a path, with the game machines capturing performance data while the avatar travels along the path. The performance data may be compared with desired performance of the game machines, to assist in determining viability of the video game builds.

20 Claims, 4 Drawing Sheets

511 Begin game execution
513 Place avatar in game world
515 Begin performance data capture
517 Perform avatar walk/ optionally have avatar actuate items
519 End performance data capture
521 Provide performance data to server Start Return 411 Identify portions of build to download
413 Identify machines for download
415 Download portions to machines Start Return

AUTOMATED VIDEO GAME TEST BED AND METHODS

CROSS-REFERENCE TO RELATED APPLICATIONS

This application claims the benefit of U.S. Provisional Patent Application No. 63/368,614, filed on Jul. 15, 2022, the disclosure of which is incorporated by reference herein.

FIELD OF THE INVENTION

The present invention relates generally to testing of video game builds, and more particularly to testing of video game performance across multiple platforms.

BACKGROUND OF THE INVENTION

Video games may provide an interactive, immersive activity for many. In doing so, video games may present to game players an extensive virtual game world in stunning detail. The virtual game world may include some or all of cityscape details, forested woodlands, building interiors, fantastical elements and scenes, and/or many more, all of which may be displayed with such realism as to blur the division between the real and the virtual.

During video game play, the display presentation to the game player naturally changes, preferably seamlessly, as the game player's game character, or avatar, wanders in the virtual game world. Generally, the game player's game machine may process large amounts of data in relatively short times in forming the displays. The game player's machine may determine a viewpoint in the virtual game world, for example the viewpoint of the game player's avatar, determine what elements of the virtual game world may be seen from that viewpoint, and, for example using potentially multiple texture maps and other information, determine what should be displayed, possibly on a display pixel-by-pixel basis. For many video games, the virtual game world may be vast, and/or a level of detail in the virtual game world may be exceedingly fine. The amount of data to be processed, and the possible permutations of what may be displayed, may therefore be exceedingly large.

Determining whether the video game may execute within desired time constraints may also therefore be difficult. Complicating matters for video game developers, the video game, or display data for the video game, may be common for at least some different types of game machines. Moreover, some types of game machines themselves, for example personal computers, may have a wide range of available configurations, with for example different processors, graphics processing units, memory, kernels, drivers, and other computer-related facets.

BRIEF SUMMARY OF THE INVENTION

Some aspects of the invention provide a test configuration for automated testing of video game builds, comprising: one or more servers, at least one of the one or more servers configured to store build files for a video game and one or more script files for use in executing the video game, the video game allowing for free form travel during game play for an avatar in the video game, the script files including commands to place the video game in a sequence of states, including successive states in which the avatar is located along successive positions on a predefined travel path within a virtual world of the video game, and configured to transmit the build files to a plurality of game machines; and a plurality of game machines, at least some of the game machines being of a same type of game machine but having different configurations, each game machine configured to execute the video game using the build files and one or more script files provided by the one or more servers and to capture performance data of the game machine while the avatar is located along the successive positions on the predefined travel path within the virtual world of the video game, and configured to transmit the captured performance data to at least one of the one or more servers; with at least one of the one or more servers configured to compare captured performance data received from the game machines with predetermined performance levels and to generate display information indicating game machine performance relative to the predetermined performance levels.

Some aspects of the invention provide a method of testing video game builds on a plurality of platforms, comprising: transmitting build files for a video game to a plurality of game machines, the game machines including game machines having different configurations; transmitting at least one script file to the plurality of game machines, the at least one script file including commands to have an avatar travel along a predetermined travel path from a first location in a virtual world of the video game to a second location in the virtual world of the video game, the predetermined travel path being one of a plurality of possible travel paths of an avatar in the video game; executing the video game by the game machines using the build files, including having the avatar travel along the predetermined travel path by using the at least one script file; capturing, by the game machines, performance data while the avatar travels along the predetermined travel path; providing the captured performance data to a server; and comparing the captured performance data with predetermined performance levels.

Some aspects of the invention provide a test farm of game machines, the game machines including at least some game machines having different configurations. One or more servers may store build files for a video game, with the servers configured to transmit the build files to the game machines, for execution by the game machines. In some embodiments the build files may include an executable file for executing the video game, and data files for use in executing the video game. The executable file may also include performance data capture functions for capturing performance data of game machine activities during execution of the video game. The servers (or one or more of them) may also store one or more script files, for placing execution of the video game, on the game machines, in a sequence of states, with the servers also configured to transmit the script files to the game machines. The game machines are configured to execute the video game and a script resulting in avatar actions in the video game, capture performance data during execution of the video game, and provide the captured performance data to the servers. The servers (or one or more of them) are configured to process the captured performance data, for example to determine if the captured performance data indicates performance below a predetermined level and/or to format displays of results indicative of performance of the game machines.

In some embodiments the servers maintain a record of changes to the build files. In some embodiments the servers, in transmitting build files to the game machines, limit transmitted build files to files that have changed since a last version of the build files were transmitted to the game machines.

In some embodiments the script file causes the avatar to travel a predefined path within the virtual game world. In some embodiments the predefined path is one of a plurality of possible travel paths within the virtual game world. In some embodiments the script file additionally causes the avatar to actuate items within the virtual game world. For example, in some embodiments the script file may have the avatar open a door in the virtual game world, operate a virtual weapon, gather a virtual item, or take some other action in the virtual world.

In some embodiments the predefined path within the virtual game world is defined by a game developer. In some embodiments the predefined path is a path recorded during play of the video game by a game player. In some embodiments the predefined path is a path recorded during play of a prior version of the video game.

In some embodiments the servers are configured to store build versions of different versions of the video game, and transmit different ones of the different versions of the video game to different game machines. In some embodiments, for example, the different versions may differ through the inclusion of different data files for use in executing the video game. In some embodiments at least some of the different game machines to which different versions of the video game are transmitted are configured the same.

These and other aspects of the invention are more fully comprehended upon review of this disclosure.

DETAILED DESCRIPTION

Figure 1:
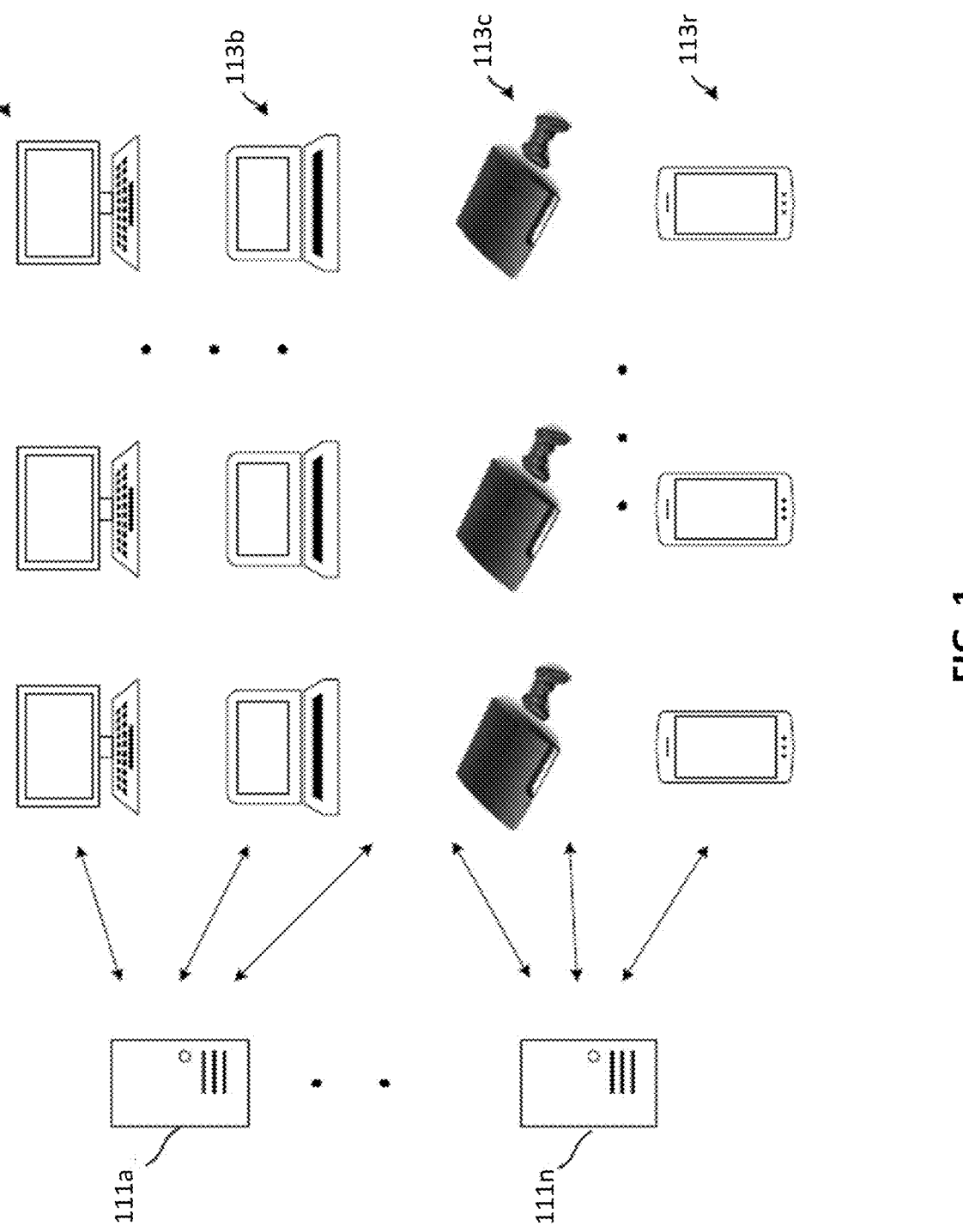
FIG. 1 is a semi-block diagram of a system including a video game test bed in accordance with aspects of the invention.

FIG. 1 is a semi-block diagram of a system including a video game test bed in accordance with aspects of the invention. The system as shown in FIG. 1 includes a plurality of servers 111*a-n*, although in some embodiments only a single server may be used. The servers may be configured as a rack or racks of servers, or otherwise. The servers may be coupled by a network (not shown in FIG. 1) to other servers and/or workstations. The servers generally include at least one processor, which may include multiple processor cores and/or multiple processors, memory, and other hardware commonly found in servers.

The servers, or one or some of them in some embodiments, store build files for a video game, and in some embodiments multiple versions of build files for the video game. The build files provide for an executable video game, either directly or with assistance of a program for operating on the build files. The servers, or one or some of them in some embodiments, also store script files for use in executing the video game. The script files may, for example, when run on a game machine executing the video game, cause execution of the video game to reach a first predefined state, transition from the first predefined state, through a plurality of intermediate states, and terminate at a second predefined state. The servers, or one or some of them, are configured to transmit the build files, or selected build files, and scripts, or selected scripts, to game machines 113*a-r*.

The game machines 113*a-r* include a plurality of different types of game machines, and at least some of the different types of game machines include game machines of different configurations. In FIG. 1, a first set of game machines 113*a* may be in the form of desktop personal computers. The desktop personal computers may include some desktop personal computers with identical hardware and software (including firmware) configurations, and some desktop personal computers with hardware and/or software configurations that may vary from others of the desktop personal computers. For example, one of the desktop personal computers may have a first graphical processing unit (GPU), and another of the desktop personal computers may have a second GPU, vastly more capable than the first GPU, and yet another of the desktop personal computers may have no GPU at all, with graphics processing being performed by a general purpose processor. Also for example, the desktop personal computers may have differing amounts of memory, different physical types of memory, different cache sizes, different firmware, and a host of other differences.

A second set of game machines 113*b* may be in the form of laptop personal computers. Like the desktop personal computers, some of the laptop personal computers may include some laptop personal computers with identical hardware and software configurations, and some of the laptop personal computers may have varying hardware and/or software configurations.

A third set of game machines 113*c* may be in the form of game consoles. In some embodiments the game machines may be game consoles of a same model, but with differing firmware versions, region versions, or system update levels. In some embodiments the game machines may be different models of the same make. In some embodiments a fourth, fifth, etc. set of game machines may be game consoles of different makes, models, etc.

An r-th set of game machines 113*r* may be in the form of smartphones. The smartphones may vary by operating system, brand, hardware configuration, and software configuration.

The servers are generally linked to or are part of a video game development system. In the video game development system, video game developers generally develop game content and operation, for example using a game engine or other video game development platforms. The servers may receive the build files from a configuration management module or system, which maintains records of status of the various files and libraries that may make up the video game, or the servers may themselves provide the configuration management functions.

The servers, or one or some of them, are configured to provide selected build files and script file(s) for the video game to the game machines, or selected ones of the game machines. The servers, or one or some of them, are also configured to receive captured performance data from the game machines, and to process the captured performance data to provide indications of performance of the game machines in executing the video game. In some embodiments the servers may include one or more game servers, for example dedicated game servers. In some embodiments the servers may be only a single server, in some embodiments the servers may be a first server for providing the build files and script file(s) and a second server for receiving the captured performance data and processing the captured performance data. In various embodiments, however, functions of the servers may be spread among a plurality of servers.

The game machines receive the build files and script file(s) for a build of the video game from the server, are configured to execute the video game (using or based on the build files), and, while executing the video game, record performance data regarding execution of the video game and provide the performance data to one or more of the servers. In some embodiments, the game machines may communicate with a dedicated game server during execution of the video game. In some embodiments, the game machines may include program instructions to replicate a dedicated game server, at least to the extent appropriate to provide simulated communications with a dedicated game server that might be expected by the game machines in executing the video game. In some embodiments the performance data comprises frames per second (fps) generated by the game machine during execution of the video game. In some embodiments the performance data comprises CPU utilization during performance of the video game. In some embodiments the performance data comprises memory utilization during execution of the video game. In some embodiments the performance data comprises device status or conditions. In some embodiments the device status or conditions comprise measured or recorded information regarding status of the game machines. In some embodiments the measured or recorded information comprises one or more device temperatures, for example temperature of or about a processor of the game machine. In some embodiments the measured or recorded information comprises battery charge or discharge of a battery of the game machine. In some embodiment the performance data is recorded throughout execution of the video game. In some embodiments the performance data is recorded at predefined intervals, or during predefined intervals, during execution of the video game. In some embodiments the performance data is provided to the servers during execution of the video game. In some embodiments the performance data is provided to the servers upon completion of execution of the video game. In some embodiments the performance data is provided to the servers in part during execution of the video game and in part upon completion of execution of the video game.

In some embodiments the game machines may also be configured to determine if performance data during execution of the video game indicates a regression of performance of the video game, and, if so, to send a notification to the one or more servers indicating such. In some such embodiments, the game machines may receive information regarding performance data for prior execution of the video game, compare recorded performance data with the prior performance data (in some embodiments as, or in response to, the performance data is recorded), determine if results of the comparison indicate a regression (e.g., reduction) in performance greater than a predetermined amount, and, in response to such a determination, provide a notification to the server indicating a regression in performance of the video game.

In some embodiments the games machines are further configured to record displays of scenes during execution of the video game. In some embodiments the recording of the displays of scenes is accomplished through recording of one or more screenshots of displays generated during execution of the video game. In some embodiments the game machines are also further configured to provide the display of the scenes to the one or more servers.

In some embodiments the game machines iteratively receive build files (and possibly script file(s)), execute the video and record performance data, and provide the performance data to the servers. In some embodiments the game machines, for iterations other than a first iteration, only receive changed build and/or script files. In some embodiments some of the different ones of the game machines, of the same type and/or the same configuration, receive different versions of at least some of the build files. For example, in some embodiments otherwise identically configured game machines may receive alternative versions of particular ones of build files, allowing for A/B testing using the alternative versions of the particular ones of the build files.

In various embodiments the script file(s) include commands to cause execution of the video game, bring execution of the video game to a first desired state, transition through a plurality of intermediate states, and reach a second desired state. The first desired state may be a state in which an avatar of a game player is in a first location in the virtual game world of the video game. The second desired state may be a state in which the avatar is in a second location in the virtual game world. The plurality of intermediate states may be states in which the avatar is in successive locations in the virtual game world, as the avatar travels from the first location to the second location. In some embodiments the game machines are configured to record scene display information, for example in the form of a screenshot, with the avatar in the first location and with the avatar in the second location. In some embodiments the first location, the successive locations, and the second location define a path of travel in the virtual game world. In some embodiments the path of travel defines a closed loop, with the first location identical to the second location. In some embodiments the path of travel defines at least one closed loop, but the path of travel as a whole does not define a closed loop, with at least one of the first location and the second location not being on the closed loop, and in some embodiments with neither the first location or the second location being on the closed loop. In some embodiments the path of travel iteratively follows the closed loop. In some embodiments the path of travel iteratively traverses the closed loop a predetermined number of times. In some embodiments the path of travel iteratively follows the closed loop without a defined end to the path of travel. In some embodiments the path of travel defines no closed loops. In various embodiments the play of the video game may be considered free form, in that a game player may determine where a player controlled game character may go, how the player controlled game may get there and what the player controlled game character may do, subject to the physical constraints of the virtual game world. So too, in some embodiments the travel path may be freely defined in the virtual game world, for example in terms of direction and distance of travel, subject to the physical constraints of the virtual game world. In addition, in some embodiments the script file(s) command the avatar to have multiple points of view from a same one of the successive locations, for example indicating that the avatar has, at least temporarily, paused travel and looked in different directions.

In some embodiments the game machines may be configured to monitor travel of the avatar along the travel path with respect to expected travel of the avatar along the travel path. In some embodiments the game machines may be configured to so monitor travel of the avatar along the travel path by determining a distance between a location of the avatar in the game world and the travel path. In some embodiments excessive distance of the avatar from the travel path may be indicative of a possible undesired execution of the video game or an error in the script file(s), for example. In some embodiments the distance may be determined as length or magnitude of a line or vector normal to the travel path. In some embodiments the game machines may be configured to determine a distance between a location of the avatar in the game world at a particular elapsed time during execution of the script file(s) and an expected location, along the travel path, of the avatar at the particular elapsed time. In some embodiments the game machines may be configured to record information regarding instances in which distance of the avatar from the travel path, or distance from an expected location on the travel path, exceeds a predetermined magnitude.

In some embodiments the game machines may be configured to monitor travel of the avatar along the travel path with respect to expected travel of the avatar along the travel path by determining distances between locations of the avatar at different times during execution of the script file(s), and comparing those distances to predetermined distances and/or expected distances. For example, in some embodiments the game machines may be configured to periodically record locations of the avatar, for example at predetermined time periods, determine distances between successive ones of the recorded locations, and compare those distances with predetermined distances and/or expected distances. In some embodiments, for example, if the distances are less than the predetermined distances and/or greater than expected distances, in either case particularly for multiple successive recorded locations, the avatar may be failing to travel along the travel path as desired or expected. For example, successive recorded locations, particularly multiple successive recorded locations, in which the avatar remains within a bounded area may be indicative of a failure of the avatar to navigate the travel path, which again may indicative of possible undesired execution of the video game or an error in the script file(s), for example. In some embodiments the game machines may be configured to record information regarding instances in which successive recorded distances, or multiple successive recorded distances, are less than predetermined distances and/or greater than expected distances.

In some embodiments the script file(s) may include commands for having the avatar perform actions other than traveling in the virtual world. In some embodiments the script file(s) may have the avatar actuate virtual items in the virtual world. For example, the script file(s) may have the avatar open virtual doors, fire virtual weapons, pick up virtual items, etc. at locations in the virtual world.

In some embodiments the script file(s) may be created by developers of the video game, or personnel involved in the testing of the video game. In some embodiments the script file(s) may be based on, or created using, data from actual play by game players of prior versions of the video game.

Figure 2:
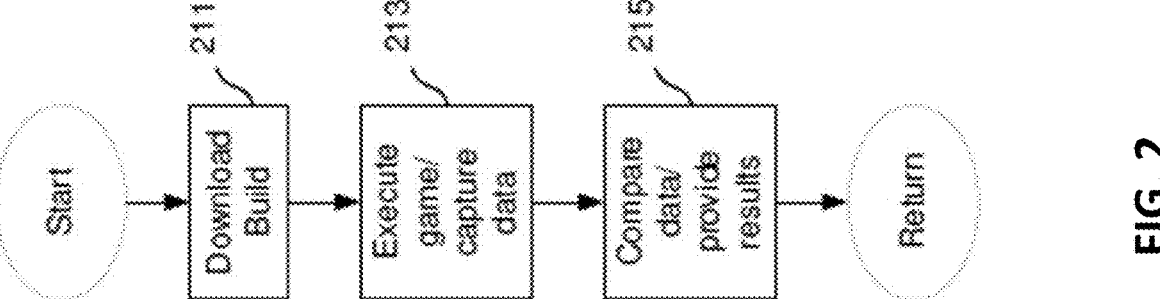
FIG. 2 is a flow diagram of a process for generating performance results from game machines during the execution of a video game in a test farm, in accordance with aspects of the invention.

FIG. 2 is a flow diagram of a process for generating performance results of a game machine during the execution of a video game in a test farm. In some embodiments the process may be performed by the system of FIG. 1. In some embodiments, portions of the process may be performed by one or more servers, for example the servers of FIG. 1. In some embodiments, portions of the process may be performed by one or more game machines, for example the game machines of FIG. 1. In some embodiments, the process, or portions of the process, may be performed by one or more processors, for example as programmed by program instructions.

In block 211, the process downloads build files for a video game. In some embodiments the process also downloads script file(s). In some embodiments the build files are downloaded from one or more servers, for example the servers of FIG. 1. In some embodiments the build files are downloaded to one or more game machines, for example the game machines of FIG. 1. In some embodiments the build files are downloaded to a plurality of game machines. In some embodiments only build files that are different than build files for a previous version of the video game are downloaded. In some embodiments different game machines receive different build files. In some embodiments different game machines, that are identically configured, receive different build files. In some embodiments the build files are transmitted from the one or more servers to the one or more game machines. In some embodiments the build files are sufficient to provide for execution of the video game. In some embodiments the build files, after being utilized by another program, are sufficient to provide for execution of the video game. The game machines may have different configurations and be in a form of a desktop computer, laptop, video game console, tablet, smartphone, or other form. The build files may have executable files for executing the video game and data files to use during the execution of the video game. The one or more servers may also store and transmit to the game machines script files for executing the video game in a sequence of states. In some embodiments, different sets of build files may be downloaded to the game machine. In some embodiments information of prior performance of the game machine, or performance of a game machine with the same configuration, may also be downloaded to the game machine. In some embodiments the game machine may be configured check if the build files are sufficient to execute the video game, or to execute the video game without reference to missing files.

In block 213, the process executes the video game and captures performance data. In some embodiments the game machines, for example some or all of the game machines of FIG. 1, execute the video game and captures performance data. In some embodiments execution of the video game includes communicating with a dedicated game server. In some embodiments the executable files of the build files may include dedicated game server simulation functions, to simulate communications between a game machine and a dedicated game server. The executable files of the build files may include data capture functions for capturing performance data of game machine activities during the execution of different video game builds. The game machine may execute the executable files, data files, and script files that result in actions performed by the avatar in the video game. In some embodiments, the script file causes the avatar to travel a predefined path within the virtual game world. In some embodiments, the script file additionally causes the avatar to actuate items within the virtual game world. For example, the script file may have the avatar open a door in the virtual game world, operate a virtual weapon, gather a virtual item, or take some other action in the virtual world. The process may capture performance data when the avatar performs the commanded actions. In some embodiments, the captured performance data may be in the form of display processing requirements, such as frames per second. In some embodiments the captured performance data may be in the form of processor and/or memory utilization requirements.

In some embodiments the captured performance data may be in the form of device conditions, for example processor temperature conditions and/or battery charge/discharge conditions.

In some embodiments the process may record display information of the video game, for example in the form of screenshots, with the avatar at the beginning of the travel path and with the avatar at the end of the travel path, and/or at predetermined positions on the travel path. In some embodiments the process may monitor travel of the avatar along the travel path with respect to expected travel of the avatar along the travel path. In some embodiments the process may record information regarding instances in which distance of the avatar from the travel path, or distance from an expected location on the travel path, exceeds a predetermined magnitude. In some embodiments the process may periodically record location of the avatar and record information regarding instances in which successive recorded distances, or multiple successive recorded distances, are less than predetermined distances and/or greater than expected distances for expected locations of the avatar.

In some embodiments the process may also compare the performance data, or some of it, to performance data of a prior execution of the video game. In some embodiments the process may provide a notification if results of the comparison indicate that the performance data indicates reduced performance, by a predetermined amount, of execution of the video game.

In some embodiments, the game machine further executes different sets of build files and captures the performance data of the different video game configurations.

In block 215, the process compares the performance data and generates data results. The captured performance data may be transmitted to the one or more servers from the game machine. In some embodiments the captured performance data may be transmitted to the server(s) during execution of the video game. In some embodiments the captured performance data may be transmitted to the server(s) after execution of the video game completes. In some embodiments the captured performance data may be transmitted to the server(s) in part during execution of the video game and in part after execution of the video game completes. In some embodiments only predetermined data results may be transmitted to the server(s) during execution of the video game. In some embodiments no captured performance data or data results may be transmitted to the server during execution of the video game. In some embodiments, the one or more servers determine if the captured performance data indicates performance below a predetermined level and/or to format displays of results indicative of performance of the game machines. In some embodiments, the performance data and results may be viewable through a visualization dashboard generated on the game machine or another device connected to the one or more servers. In some embodiments, the captured performance data of one set of build files may be compared to the performance data of a different set of build files after such data sets are transmitted back to the one or more servers. The one or more servers may then process and compare the performance data of the different build files and provide results as to which configuration provides optimum performance.

In some embodiments the recorded display information of the video game, for example with the avatar at the beginning and the end of the travel path, is also transmitted to the one or more servers from the game machine. In some embodiments the process may also provide for display of the scenes or screenshots of the video game with the avatar at the first location and the avatar at the second location. In some embodiments the display of the scenes or screenshots are provided by a workstation (separate and apart from the game machines which executed the video game as part of operations of block 213) coupled to the one or more servers. The displays may be used, for example, to assist in determining a state of the video game at a beginning of avatar travel along the travel path and at an end of avatar travel along the travel path. In some embodiments the display information may be used in determining whether different game machines begin and end travel of the avatar in similar states.

In some embodiments results of the monitoring of travel of the avatar along the travel path is also transmitted to the one or more servers from the game machine. In some embodiments the results of the monitoring of the travel of the avatar comprises information regarding instances in which distance of the avatar from the travel path, or distance from an expected location on the travel path, exceeds a predetermined magnitude. In some embodiments the results of the monitoring of the travel of the avatar instead or in addition comprises information regarding instances in which successive recorded distances of travel of the avatar, or multiple successive recorded distances, are less than predetermined distances and/or greater than expected distances for expected locations of the avatar. In some embodiments the process determines that the results of the monitoring of travel of the avatar along the travel path indicates a failure of proper execution of the video game (or an error in the script file(s)). In some embodiments a failure is indicated in the event of any instances in which the recorded distances are too great or too small. In some embodiments a failure is indicated in the event of occurrences of a greater than a predetermined plurality of such instances, or a greater than a predetermined plurality of such instances for successive recorded locations of the avatar. In some embodiments the process additionally determines, in the event of indication of a failure, whether the recorded position of the avatar in the game world at the time of failure indicates a failure of the avatar to navigate the game world along the travel path. For example, in some embodiments the process may determine whether a wall or other obstruction in the video game world bisects a line between the recorded position of the avatar at a time of indication of the failure and an expected position of the avatar at the time of indication of the failure.

The process thereafter returns.

Figure 3:
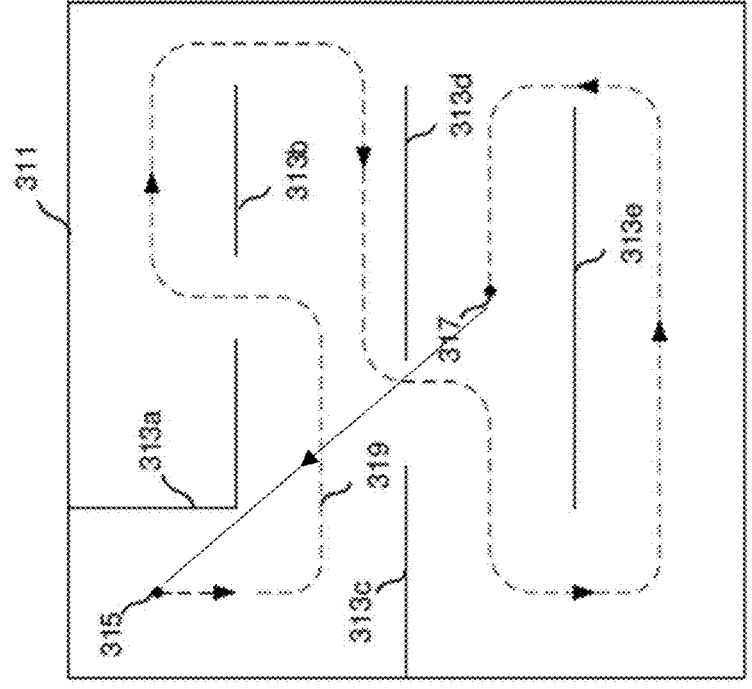
FIG. 3 illustrates a portion of an example virtual video game world, and an example travel path of an avatar in the video game world, in accordance with aspects of the invention.

FIG. 3 illustrates a top view of a layout of an example portion of a virtual video game world, and two embodiments of example travel paths of an avatar in the video game world. The portion of the video game world of FIG. 3 may be, for example, an interior of a floor of a building 311, with four exterior walls defining a rectangular volume, for convenience. The four exterior walls may include first and third exterior walls in parallel, with opposing ends of the first and third exterior walls connected by second and fourth exterior walls, respectively. The building may have a plurality of interior walls 313_a-e_. A first L-shaped wall 313_a_ may extend into the volume from the first exterior wall. The first wall is shown as extending perpendicularly from the first exterior wall (and parallel to a second exterior wall), at a point approximately one quarter of a length of the first exterior wall from the second exterior wall. The first wall extends in this manner across approximately one quarter of the distance between the first exterior wall and the third exterior wall, and then extends a similar distance towards the fourth exterior wall, parallel to the first exterior wall. The first L-shaped wall has a door hinged to its end, with the door in its closed position coupling the first wall and a second wall 313*b*. The second wall also extends parallel to the first exterior wall and towards the fourth exterior wall, with the second wall ending short of the fourth exterior wall. A third wall 313*c* extends into the volume from about a midpoint of the second exterior wall, and parallel to the first exterior wall. The third wall extends into the volume for a distance equal to slightly over approximately one quarter of the length of the first exterior wall. A fourth exterior wall 313*d* is within the volume, with the fourth wall in line with and parallel to the third wall. A gap is present between the third wall and the fourth wall, and the fourth wall, like the second wall, ending short of the fourth exterior wall. A fifth wall 313*e* is within the volume, like the fourth wall. The fifth wall is parallel to the third and fourth walls, and approximately half the distance from the third and fourth walls and the third exterior wall. There is a gap between the second exterior wall and one end of the fifth wall, and a gap between the other end of the fifth wall and the fourth exterior wall.

In some embodiments the four exterior walls demark the entirety of the virtual world of the video game. In many embodiments, however, within the four exterior walls is only a portion of the virtual world, and one or more of the exterior walls may have a doorway or other passage allowing for movement into and out of the area defined by the exterior walls.

The layout of the portion of the virtual world of FIG. 3 also shows a first travel path 319 for an avatar. The first travel path begins at a first location 315 in the virtual world and ends at a second location 317 in the virtual world. The first location is between the first wall 313*a* and the second exterior wall. The travel path proceeds towards the third wall 313*c*. Prior to reaching the third wall, the first travel path turns towards the fourth exterior wall, and proceeds between the first wall 313*a* and the third wall 313*c*, in a direction parallel to the third wall 313*c* and towards the fourth exterior wall. Upon nearing the hinged door at the end of the first wall, the first travel path passes through the doorway of the door and continues towards the fourth exterior wall, between the second wall 313*b* and the first exterior wall. The first travel path rounds the end of the second wall, passing through the gap between the second wall and the fourth exterior wall. Once past the end of the second wall, the first travel path proceeds back towards the second exterior wall, between the second wall and the fourth wall. The first travel path then turns to pass through the gap between third wall and the fourth wall, and almost circumnavigates the fifth wall, with the travel path ending at the second location 317, just short of gap between the third and fourth walls, and just short of reaching prior portions of the travel path.

The first travel path of FIG. 3 does not cross-over or intersect with itself, and therefore defines no closed loops. The first travel path of FIG. 3 also includes multiple points which share no common views, or portions of views with each other. For example, the portions of the virtual world that may be seen by an avatar at the first location 315, and points on the travel path near the first location, include no portions of the virtual world that may be seen by an avatar on much of the first travel path between the fifth wall 313*c* and the third exterior wall. The first travel path of FIG. 3, and various other embodiments, may therefore include locations that share no common views. In other embodiments the travel path may define closed loops. For example, a second travel path with a closed loop may be formed of the first travel path, and then extending the first travel path to continue from the end of the first travel path at location 317 back to the beginning of the first travel path at location 315. In some embodiments the second travel path may repeat traverses of the closed loop multiple times. In some embodiments the second travel path may repeat traverses of the closed loop a predetermined number of times, for example to extend time of execution of the video game. In some embodiments the second travel path may repeat traverses of the closed loop an indeterminate number of times.

In some embodiments the travel path may include points at which the avatar performs some action, other than traveling on the travel path. For example, in some embodiments a hinged door may be shut, and the avatar may need to take action to open the door, whether by actuating the door itself or by taking a video game action (e.g., picking up a virtual object, shooting a weapon, etc.) that causes the door to open. In some embodiments the avatar may be commanded to turn around, face a particular direction, or otherwise change the direction of viewpoint of the avatar. In some embodiments the avatar may be commanded by the script file(s) to perform actions that result in areas of the virtual game world being unlocked for access by the avatar, and in some embodiments the script files may have the avatar travel to and/or within those areas.

Figure 4:
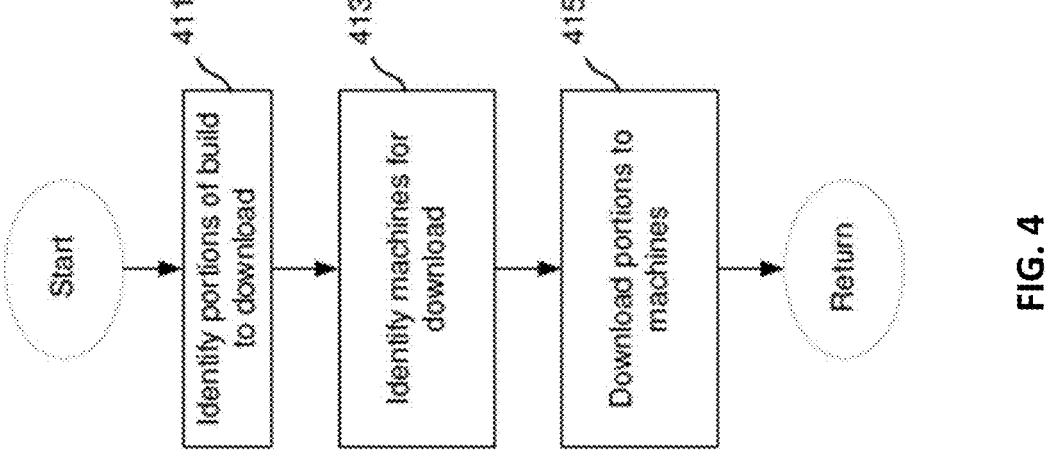
FIG. 4 is a flow diagram of a process for downloading portions of build files to game machines, in accordance with aspects of the invention.

FIG. 4 is a flow diagram of a process for downloading portions of build files to game machines. In some embodiments the process is performed by a system, for example the system of FIG. 1. In some embodiments, portions of the process may be performed by one or more servers, for example the servers of FIG. 1. In some embodiments, the process, or portions of the process, may be performed by one or more processors, for example as programmed by program instructions. In some embodiments the process performs operations of block 211 of the process of FIG. 2.

In block 411 the process identifies portions of a build of a video game to download to game machines. In some embodiments a server, for example a server of FIG. 1, identifies the portions of the build to download. In some embodiments a build of a video game includes a plurality of files, and the process determines which files of the plurality of files to download. In some embodiments the process determines that all of the plurality of files are to be downloaded. In some embodiments the process determines that only files that have changed since a last download of build files should be downloaded. In some embodiments the files to be downloaded are determined using a configuration management tool or other tool that tracks change histories of files for video game builds. In some embodiments the build files include one or more executable files and one or more data files. In some embodiments the files are in one or more libraries. In some embodiments the data files include files for use in forming displays during play of the video game. In some embodiments the data files include texture maps. In some embodiments the process identifies a first file or first set of files to download for some game machines, and identifies a second file or second set of files to download for other game machines. In some embodiments the process identifies a first file or first set of files to download for some game machines, identifies a second file or second set of files to download for other game machines, identifies a third file or third set of files to download for still other game machines, etc.

In block 413 the process identifies game machines to receive the download or downloads. In some embodiments a server, for example a server of FIG. 1, identifies the game machines to receive the download. In some embodiments a same server as the server which identified the portions of the build to download also identifies the game machines to receive the download. In some embodiments a different server (or computer) identifies the game machines to receive the download. In some embodiments the process identifies game machines to receive the download based on types of game machines. In some embodiments the process identifies game machines to receive the download based on configurations of game machines. In some embodiments the process may identify different game machines having the same configuration to receive different downloads. For example, in some embodiments the process may identify a first game machine to receive a download including a file with a first texture map, and the process may identify a second game machine, with an identical configuration as that of the first game machine, to receive a download including the file with a second texture map instead of the first texture map.

In block 415 the process downloads the identified portions of the build to the identified game machines. In some embodiments a server, for example a server of FIG. 1, downloads the identified portions of the build to the identified game machines. In some embodiments a same server as the server which identified the portions of the build to download and/or a same server as the server which identified the game machines to receive the download also performs the downloads. In some embodiments a different server performs the downloads to the game machines.

The process thereafter returns.

Figure 5:
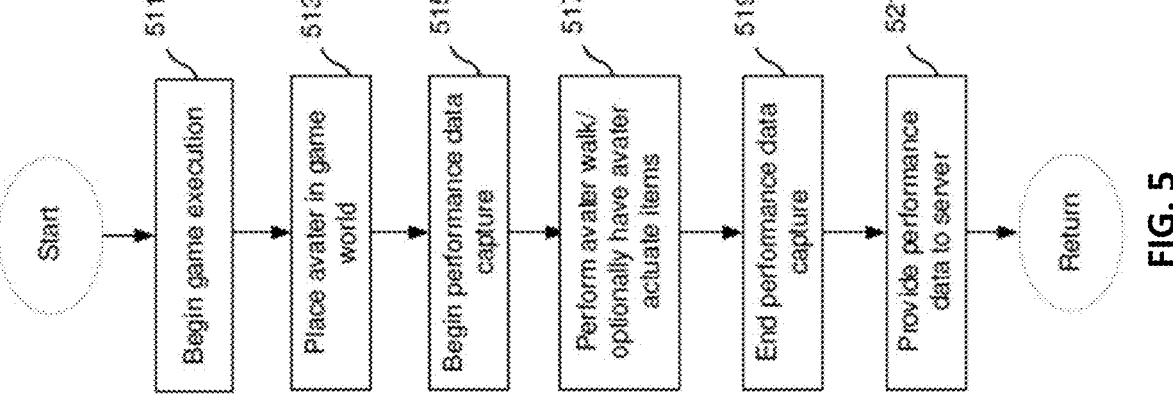
FIG. 5 is a flow diagram of a process for executing the video game and capture performance data.

FIG. 5 is a flow diagram of a process for executing the video game and capture performance data. In some embodiments the process is performed by a system, for example the system of FIG. 1. In some embodiments, portions of the process may be performed by one or more game machines, for example the game machines of FIG. 1. In some embodiments, the process, or portions of the process, may be performed by one or more processors, for example as programmed by program instructions. In some embodiments the process performs operations of block 213 of the process of FIG. 2.

In block 511 the process begins video game execution. In some embodiments the game machine begins executing the video game. In some embodiments the game machine begins executing the video game in response to receiving a command to execute the video game. In some embodiments the command to execute the video game is a command received from another computer, with the game machine configured to execute commands from the other computer. In some embodiments the command is provided as part of commands to load the video game into memory of the game machine. In some embodiments the process starts a timeout counter upon beginning video game execution, or upon commanding commencement of video game execution. The timeout counter may be used in determining to cease capturing performance data, and/or cease execution of the video game, for example as discussed with respect to operations of block 519. The timeout counter generally increases with time, and the timeout counter may therefore be considered an elapsed time clock. In some embodiments beginning execution of the video game, or execution of the video game, includes communications with a dedicated game server or a simulated dedicated game server executing on the game machine.

In block 513 the process places an avatar in a predetermined position in a virtual world of the video game. The avatar may be, for example, a game player-controlled type of game character, that would normally be controlled by a game player playing the video game. In some embodiments, in preparation to do so, the process executes commands of one or more script files to allow for placement of the avatar in the predetermined position. For example, execution of video games commonly includes navigation and selection of various menus prior to play of the video game, and the script files may include commands to perform such navigation and selection. In addition, the script files may include commands to place play of the video game in a known state, with the avatar in the predetermined position in the virtual world. In some embodiments the script file may directly set the state of the video game to the known state, in other embodiments the script file may cause the avatar to travel in the virtual world and/or otherwise take action in the virtual world to reach the predetermined position. In various embodiments the predetermined position is not a position in the virtual world that the avatar is normally positioned at the start of video game play. In some embodiments the predetermined position is a first location in a travel path, for example as discussed with respect to FIG. 3.

In block 515 the process begins capturing performance data for execution of the video game by the game machine. In some embodiments the performance data comprises frames per second (fps). In some embodiments, the performance data may include CPU utilization, GPU utilization, memory utilization, and/or other metrics. In some embodiments the performance data may include temperature conditions for a processor of the game machine, or other information regarding conditions or states of the game machine. Generally the game machine executing the video game captures the performance data. The game machine may store the captured performance data in memory of the game machine. In some embodiments the process also records scene display information, which in some embodiments may be in the form of screenshots.

In block 517 the process causes the avatar to travel along a travel path from the predetermined position to another location in the virtual world of the video game. In some embodiments the process also records scene display information, which in some embodiments may be in the form of screenshots, with the avatar at the predetermined position and with the avatar at the other location. In some embodiments the process may also communicate with a dedicated game server, or a simulated game server, while the avatar travels along the travel path. In some embodiments a script file or files causes the avatar to travel along the travel path. The predetermined position may be considered a beginning location for the travel path, and the other location may be considered an ending location for the travel path. In some embodiments the other location may be the beginning location such that the travel path as a whole forms a closed loop, and in other embodiments the other location may be some other location on a closed loop formed by portions of the travel path. In some embodiments the avatar may iteratively traverse the closed loop multiple times. In some embodiments the virtual world of the video game may include a plurality of different rooms within one or more structures, and the travel path may include travel within more than one of the plurality of different rooms. The travel path may be, for example, as discussed with respect to FIG. 3 or elsewhere herein. As the avatar travels along the travel path, the game machine performs functions associated with movement of the avatar in the virtual world, including generation of display information for scenes from the changing point of view of the avatar. In some embodiments the process also causes the avatar to perform other actions, for example actuating or moving virtual objects in the virtual world. The virtual objects may be, for example, virtual weapons or virtual items. Actuation or movement of the virtual objects may result in changes to scenes viewed by the avatar, for example by opening windows into other areas of the virtual world or by changing a scene, for example by causing an explosion, within the virtual world. In some embodiments the process also monitors travel of the avatar along the travel path. In some embodiments the process, during travel of the avatar, also compares the captured performance data, or some of it, to performance data from travel of the avatar during a prior execution of the video game, for example an execution of the video game with different build files. In some such embodiments, the process may provide a notification if results of the comparison indicate a regression in performance of the video game during travel of the avatar.

In block 519 the process ceases capturing performance data. For example, once the operations of block 517 are complete, the avatar has traveled to the end of the travel path, and the process may cease execution of the video game. In some embodiments the process may also cease capturing performance data (and execution of the video game in some embodiments) in the event, during operations of block 517, information indicative of a failure of proper execution of the video game or a failure of the avatar to follow the travel path occurs. In some embodiments the process may also cease capturing performance data (and execution of the video game in some embodiments) if the timeout counter exceeds a predetermined number. The timeout counter may exceed the predetermined number, for example, if the video game fails to begin execution, if a level of the video game fails to load, if the avatar takes an excessive amount of time in traveling the travel path (e.g., due to excessively low video game framerates), etc. In addition, in some embodiments execution of the video may unexpectedly cease, for example if the video game has an unexpected exception or otherwise crashes, in which case the process also ceases capturing performance data.

In block 521 the process provides the captured performance data to the server. In some embodiments the process also provides the recorded scene display information to the server. In some embodiments the process also provides information from the monitoring of travel of the avatar along the travel path to the server. In some embodiments the process may provide the captured performance data, recorded scene display information, and information from the monitoring of travel of the avatar, and information regarding whether performance data capture was ceased due to a timeout situation or video game crash to a server as part of the operations of block 517. For example, in some embodiments the captured performance data, and/or the other information, may be transmitted to the server(s) during execution of the video game. In some embodiments the captured performance data, and/or the other information, may be transmitted to the server(s) after execution of the video game completes. In some embodiments the captured performance data, and/or the other information, may be transmitted to the server(s) in part during execution of the video game and in part after execution of the video game completes. In some embodiments only predetermined data of the captured performance data and/or the other information may be transmitted to the server(s) during execution of the video game. In some embodiments no captured performance data or the other information may be transmitted to the server during execution of the video game.

The process thereafter returns.

Figure 6:
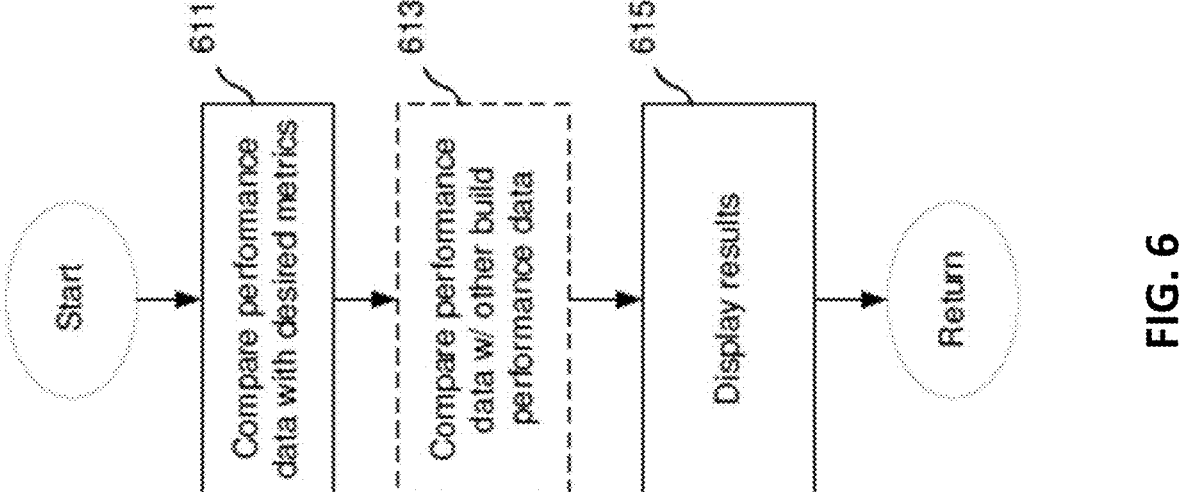
FIG. 6 is a flow diagram of processing of captured performance data.

FIG. 6 is a flow diagram of processing of captured performance data. In some embodiments the process may be performed by the system of FIG. 1. In some embodiments, portions of the process may be performed by one or more servers, for example the servers of FIG. 1. In some embodiments, portions of the process may be performed by one or more game machines, for example the game machines of FIG. 1. In some embodiments the process may be performed by a computer workstation, for example a computer workstation coupled to the servers. In some embodiments, the process, or portions of the process, may be performed by one or more processors, for example as programmed by program instructions.

In block 611 the process compares captured performance data with desired metrics. In some embodiments the captured performance data is performance data of a game machine executing a video game, while an avatar of the video game is performing predetermined actions. In some embodiments the predetermined actions include travel by the avatar over a predefined travel path. In some embodiments the performance data is game machine fps during travel by the avatar along the travel path. In some embodiments the game machine fps is game machine fps for each successive location of the travel path. In some embodiments the game machine fps is game machine fps for predetermined periods of time during avatar travel along the travel path. In some embodiments the performance data is CPU utilization, GPU utilization, or memory utilization of the game machine executing the video game during avatar travel along the travel path. In some embodiments the performance data is temperature conditions for a processor, battery charge or discharge of a battery of the game machine, or some other condition or status of the game machine. In some embodiments the performance data is compared to predetermined desired levels for the performance data. In some embodiments the process also determines if information regarding travel of the avatar indicates a failure of proper execution of the video game (or an error in the script file(s)).

In optional block 613, the process compares the performance data with performance data for the game machine, or other game machines, for different builds of the video game. In some embodiments the process compares performance data for different builds that were executed on the same game machine, or different game machines having the same configuration.

In block 615 the process displays results of the comparisons of the performance data. In some embodiments the process displays the results in a graphical format. In some embodiments the process displays the results for multiple time periods and/or multiple locations of the avatar on the travel path. In some embodiments the process displays results of the comparisons indicating a failure to achieve desired performance levels differently than comparisons indicating success in achieving desired performance levels. In some embodiments the process also displays recorded scene display information. In some such embodiments, the recorded scene display information may be with an avatar at a beginning of a travel path and at an end of the travel path.

The process thereafter returns.

Although the invention has been discussed with respect to various embodiments, it should be recognized that the invention comprises the novel and non-obvious claims supported by this disclosure.

What is claimed is:

1. A test configuration for automated testing of video game builds, comprising:
   one or more servers, at least one of the one or more servers configured to store build files for a video game and one or more script files for use in executing the video game, the video game allowing for free form travel during game play for an avatar in the video game, the script files including commands to place the video game in a sequence of states, including successive states in which the avatar is located along successive positions on a predefined travel path within a virtual world of the video game, and configured to transmit the build files to a plurality of game machines; and a plurality of game machines, at least some of the game machines being of a same type of game machine but having different configurations, each game machine configured to execute the video game using the build files and one or more script files provided by the one or more servers and to capture performance data of the game machine while the avatar is located along the successive positions on the predefined travel path within the virtual world of the video game, and configured to transmit the captured performance data to at least one of the one or more servers;

with at least one of the one or more servers configured to compare captured performance data received from the game machines with predetermined performance levels and to generate display information indicating game machine performance relative to the predetermined performance levels.

2. The test configuration of claim 1, wherein the at least one of the one or more servers is further configured to determine changed build files for the video game since a last transmission of build files of the video game to a one of the game machines, and to only transmit the changed build files to the one of the game machines.

3. The test configuration of claim 1, wherein the script files further includes commands for the avatar to take an action to actuate a virtual object in the virtual world of the video game.

4. The test configuration of claim 3, wherein the video game requires actuation of the virtual object in order for the avatar to access an area of the virtual world of the video game.

5. The test configuration of claim 1, wherein the at least one of the one or more servers is further configured to transmit a first set of build files for the video game to a first game machine of the plurality of game machines and to transmit a second set of build files for the video game to a second game machine of the plurality of game machines, the first game machine and the second game machine having identical hardware configurations.

6. The test configuration of claim 5, wherein the at least one of the one or more servers is further configured to compare captured performance data from the first game machine and captured performance data from the second game machine.

7. The test configuration of claim 6, wherein the first set of build files includes at least one texture map different than texture maps of the second set of build files.

8. The test configuration of claim 1, wherein the captured performance data comprises frames per second.

9. The test configuration of claim 1, wherein the captured performance data comprises at least one of CPU utilization, GPU utilization, and memory utilization.

10. The test configuration of claim 1, wherein the game machines comprise personal computers, with at least some of the personal computers having different hardware configurations.

11. The test configuration of claim 1, wherein the game machines comprise smartphones, with at least some of the smartphones having different hardware configurations.

12. The test configuration of claim 1, wherein the game machines comprise game consoles.

13. The test configuration of claim 12, wherein at least some of the game consoles have different configurations.

14. The test configuration of claim 1, wherein the travel path of the script files is based on a travel path taken by a player controlled game character in a prior version of the video game.

15. A method of testing video game builds on a plurality of platforms, comprising:

transmitting build files for a video game to a plurality of game machines, the game machines including game machines having different configurations;

transmitting at least one script file to the plurality of game machines, the at least script file including commands to have an avatar travel along a predetermined travel path from a first location in a virtual world of the video game to a second location in the virtual world of the video game, the predetermined travel path being one of a plurality of possible travel paths of an avatar in the video game;

executing the video game by the game machines using the build files, including having the avatar travel along the predetermined travel path by using the at least one script file;

capturing, by the game machines, performance data while the avatar travels along the predetermined travel path;

providing the captured performance data to a server; and comparing the captured performance data with predetermined performance levels.

16. The method of claim 15, further comprising determining build files that have changed since a prior transmission of the build files to the game machines, and further transmitting only the changed build files to the game machines.

17. The method of claim 15, wherein the build files transmitted to a first game machine of the plurality of game machines are different than the build files transmitted to a second game machine of the plurality of game machines, the first game machine and the second game machine having identical hardware configurations.

18. The method of claim 15, wherein the script files include commands for the avatar to actuate a virtual object while on the travel path.

19. The method of claim 15, wherein the predetermined travel path is based on a travel path of a player controlled game character during play of a prior version of the video game.

20. The method of claim 15, further comprising ceasing capturing performance data in response to time of travel of the avatar along the travel path exceeding a predetermined amount of time.

* * * * *